United States Patent [19]
Cospen et al.

[11] 3,896,207
[45] July 22, 1975

[54] PROCESS FOR FORMING HOLLOW BODIES OF THERMOPLASTIC MATERIAL

[75] Inventors: Jean Cospen, Cachan; Bernard Baumann, Paris, both of France

[73] Assignee: Societe de Vente de l'Aluminium Pechiney, Paris, France

[22] Filed: Dec. 13, 1973

[21] Appl. No.: 426,708

[30] Foreign Application Priority Data
Dec. 13, 1972  Luxemburg............................ 66646

[52] U.S. Cl.................. 264/322; 264/292; 264/327
[51] Int. Cl........................... B29b 3/00; B29d 23/13
[58] Field of Search............. 264/322, 327, 92, 292

[56] References Cited
UNITED STATES PATENTS

| | | | |
|---|---|---|---|
| 3,159,695 | 12/1964 | Behringer | 264/92 X |
| 3,256,564 | 6/1966 | Welshon | 264/327 X |
| 3,331,908 | 7/1967 | Shelby | 264/322 |
| 3,484,518 | 12/1969 | Ignell | 264/322 X |
| 3,631,580 | 1/1972 | Swartz | 264/322 X |

*Primary Examiner*—Richard R. Kucia

[57] ABSTRACT

A process for stamping blanks of thermoplastic material for use in the formation of hollow bodies in which prior to the stamping operation the blanks are heated in predetermined heated zones to the fusion point of the thermoplastic material with the heated zones being surrounded by zones which remain below fusion temperature and which in the formation of hollow cylindrical bodies, the heated zones are in the form of continuous or interrupted ring segments which are radially interconnected.

4 Claims, 7 Drawing Figures

PROCESS FOR FORMING HOLLOW BODIES OF THERMOPLASTIC MATERIAL

This invention relates to a process for stamping blanks of thermoplastic material for use in the manufacture of hollow bodies.

Conventional processes for the conversion of thermoplastic material, starting with granules, powder or sheets, have a number of disadvantages in instances where a high rate of production of hollow bodies is desired for use in packaging. On the one hand, there are technical problems due to the irregularities in the thickness of the walls and the variations in density and crystallinity of the material and, on the other hand, the complexity of the apparatus for conversion requires a very high investment which is insufficiently compensated by the rate of production which are themselves relatively slow in the rate of cooling of the bodies. There has been little possibility of attaining the rates of machines used for transforming metal sheets. It is for this reason that it has not as yet been economically possible to replace metallic sheet conversion by any special synthetic materials, which are capable of converting into heat the energy produced in the press, such as acrylonitrile, butadiene and styrene, which are too costly for mass packaging of materials. Furthermore, the lack of homogeneity, arising from the variable conditions of transformation of thermoplastic materials in sheet form, is reproduced in the texture of the shaped product and prevents in any event, adequate comparison with a molding process.

It has previously been proposed to obtain better results by heating a sheet of thermoplastic material to varying temperatures to make certain parts of the sheet more readily deformable than others and, there has been provided for this purpose a heating zone formed of concentric members at which different temperatures are imparted. However, the results obtained with such apparatus have been insufficient for it has not been possible completely to eliminate any folds and there is still great irregularity in the thickness of the walls.

The process provided by the present invention relates to the molding of the sheets of thermoplastic material, and/or an array of these sheets, on a stamping press intended for the deformation of metal sheets. EVen if these sheets comprise mixtures of different materials, for example, high pressure polyethylene and polypropylene, their mechanical characteristics are different. However, these differences are much less pronounced than those which exist between thermoplastic sheets and thin sheets of aluminum. This is particularly true from the standpoint of their softening points (Vicat point), the stretching ratios, and thermo-inertia.

For this reason, the process of stamping molds of thermoplastic material for the formation of hollow bodies comprises, before the introduction of the blanks to the stamping station, subjecting the blanks to heating in preferential zones up to the melting point of the plastic material, these zones being defined on all sides by zones which remain significantly below the melting point.

For the formation of cylindrical hollow bodies, the heated zones are in the form of annular segments which, after stamping, are transformed into quadrilateral shapes.

With certain materials, to facilitate the distribution of materials to the premelting stage, it is possible to allow radial communication between several heated zones.

For purposes of illustration, but not of limitation, the invention will be described with the aid of examples, illustrated in the accompanying drawings in which.

The first example which will be described relates to the formation of a hollow body from a blank of polypropylene, having a thickness of 0.5 mm. The total heating time of the preferential zones is 15 seconds, and the desired amount of heating can be effected at a single station, but it is preferred to divide this operation between a sufficient number of stations to make it possible to follow the cycle time of transformation, which is 0.5 seconds. The heating zones are raised to a temperature of from 140° to 150° C, and the "cold" zones, that is to say, the parts which have not been directly heated reach a temperature of 60° C which is clearly below the softening temperature of the thermoplastic material. The border zones are preferably heated to a temperature higher than those which form the cylindrical wall.

In the case where the temperature of the cold zones is higher, the ratio between the heated surfaces and the others varies considerably; if in the present case it is in the order of 10:1, according to the materials used and the desired forms, this ratio could be almost reversed. Such will be the case, for example, in the use of polyvinyl chloride for which the temperature can be markedly raised to as high as 200° C. Since this material is normally destroyed when it is subjected to such high temperatures, the heating period should be reduced to the maximum extent possible and the heated surfaces should be reduced to a minimum.

Figure 1:
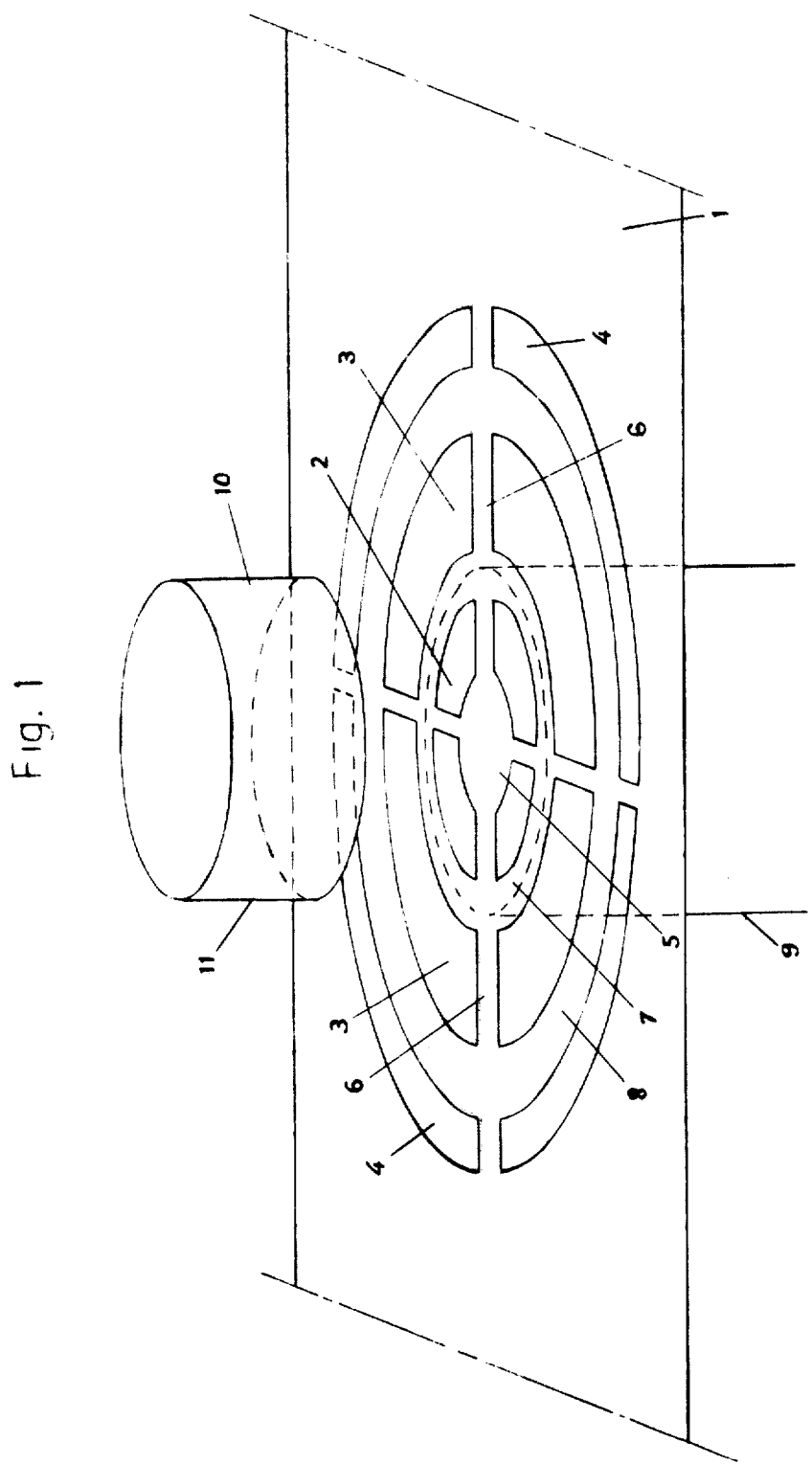
FIG. 1 is a schematic perspective view of the blank at the point where it reaches a stamping station, in accordance with the practice of this invention.

Referring now to FIG. 1, the blank 1 arrives at the time when the zones 2, 3 and 4 have been heated to the desired temperature. Between these heated zones at the prefusion temperature, there is a network of surfaces, more or less large, which have not been directly subjected to heating and which comprise, starting from a circular surface 5 at the center, radial bands 6 joined to concentric rings 7 and 8. When the blank is properly centered below the matrix 9, the punch 10 descends and engages the central portion of the blank 1. The distance between the outer wall 11 of the punch 10 and the interior wall of the matrix 9 is equal to the blank and also the hollow body portion to be formed.

The successive phases of stamping follow the steps shown in the schematic drawings of FIGS. 2–5.

Figure 2:
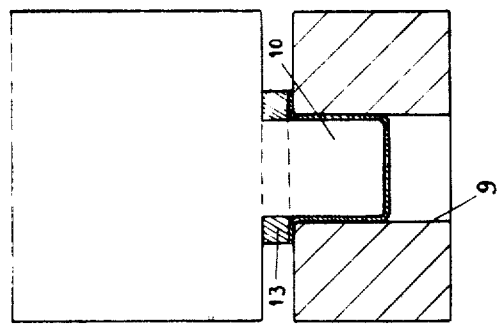
FIGS. 2–5 are sectional elevational views showing various stages of the stamping of the blank by the stamping tool.
Figure 3:
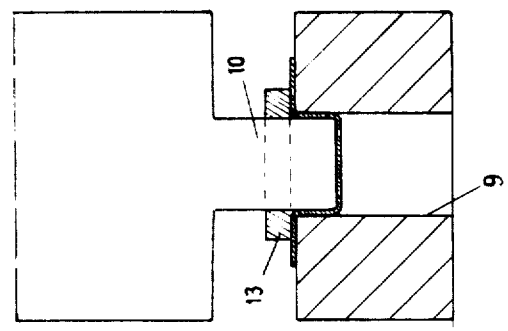
Figure 4:
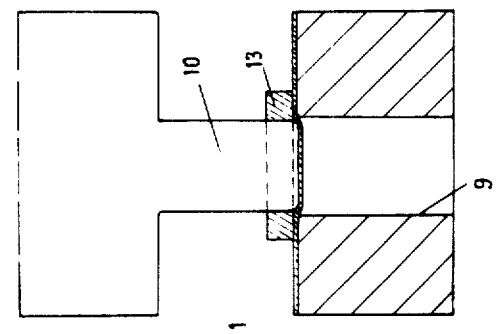

The punch 10 surrounded by a blank press 13 is separated from the matrix 9 to allow for the introduction of the blank 1, as shown in FIG. 2. The various parts of the press are maintained at a temperature of 25° C ± 3°. Because the tool is maintained at a temperature clearly lower than the solidification temperature of the material, this material is in practice, cooled under pressure in a very short time.

Figure 5:
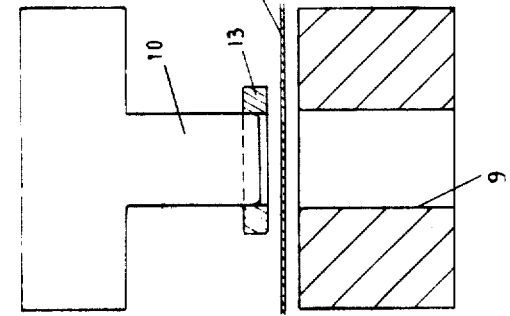

In the first phase of the transformation, the punch 10 enters into the matrix 9, rounding off the bottom of the container in the zones 2 which have been raised 250°C. The further descent of the punch 10 (FIG. 4) entrains the blank for displacement towards the bottom of the cavity 9 until the upper edge is formed in the heated zones 4 which have been raised also to a temperature of 150°C (FIG. 5). For the intermediate zones 3, a temperature of 130°C is sufficient.

Figure 6:
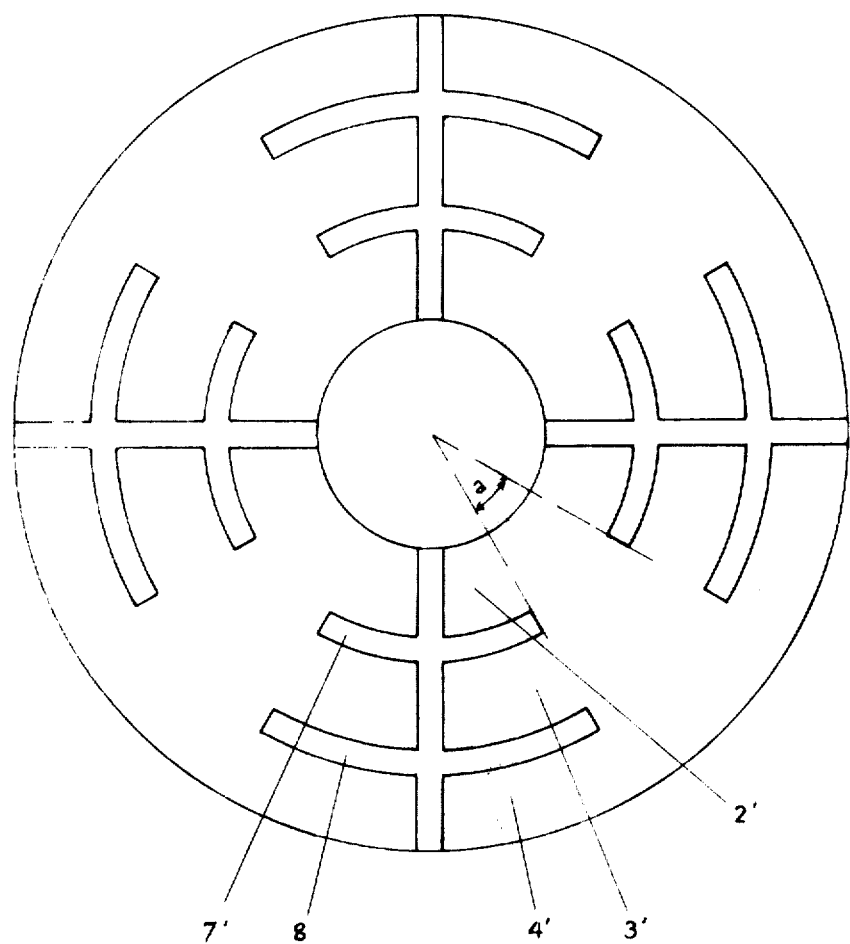
FIG. 6 is a view similar to that of FIG. 1 showing a modification in the distribution of heating zones in the blank.

Another possible distribution of the heating zones is shown in FIG. 6. This consists in interrupting over a more or less great circle the unheated concentric zones 7 and 8 between two radial zones so that the pre-fusion surfaces 2, 3 and 4 come into communication with each other. Such formation can be used, for example, when the concentric zones are very drawn together. It is also possible to have alternating annular "zones" continuous and interrupted.

Figure 7:
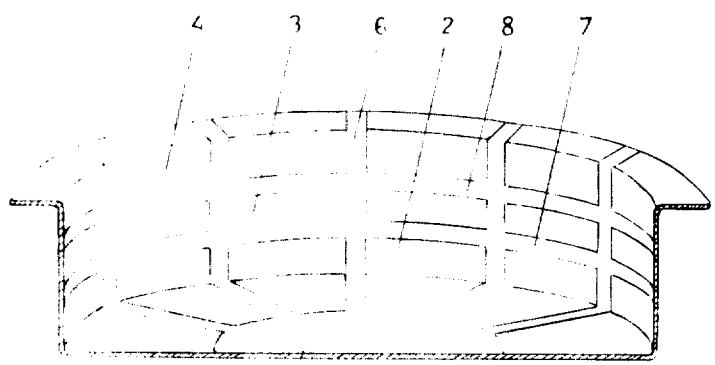
FIG. 7 is a sectional view in perspective of a container formed by the process of this invention.

The deformations produced in the different zones of the blanks are shown in FIG. 7. It is clear that the annular segments of trapezoidal sections are transformed into orthogonal quadrilaterals which shows when there is displacement of the material towards the interior of the surfaces limited by the cold zones. Because all of these transformations take place between the interior surfaces of the matrix 9 and exterior surface of the punch 10, the thickness of the walls of the containers remains uniform.

It will be understood that changes may be made in the details of construction arrangement without departing from the spirit of the invention as defined in the following claims:

We claim:

1. A process for stamping blanks of thermoplastic material for the formation of hollow bodies of cylindrical shape in which, prior to the stamping stage, the blanks are heated to the pre-fusion point of the thermoplastic material in zones in the form of ring segments which are transformed into quadrilaterals upon stamping, with the portion between said ring segments below the pre-fusion point of the thermoplastic material.

2. A process as claimed in claim 1 in which the ring segments of the heated zones are interrupted by curved parts of non-heated zones and which include non-heated zones connecting said curved parts.

3. A process as claimed in claim 1 in which the portions below the fusion point of the thermoplastic material represent unheated zones of the stamping blank in the form of radially spaced apart circular portions and circumferentially spaced apart radially extending sections which interconnect the circular portions.

4. A process as claimed in claim 3 in which the circular portions comprise segments of a circle.

* * * * *